(12) United States Patent
Call et al.

(10) Patent No.: US 7,972,194 B2
(45) Date of Patent: Jul. 5, 2011

(54) WELD GUN TIP DRESSING

(75) Inventors: Richard C. Call, Franklin, TN (US);
Marvin J Kavan, Columbia, TN (US);
Lois T. Kempfer, Lewisburg, TN (US);
Leland Paul Keesling, Columbia, TN (US); Melvin Alspach, Columbia, TN (US)

(73) Assignee: GM Global Technology Operations LLC, Detroit, MI (US)

( * ) Notice: Subject to any disclaimer, the term of this patent is extended or adjusted under 35 U.S.C. 154(b) by 321 days.

(21) Appl. No.: 12/326,945

(22) Filed: Dec. 3, 2008

(65) Prior Publication Data
US 2010/0136883 A1 Jun. 3, 2010

(51) Int. Cl.
*B24B 51/00* (2006.01)
(52) U.S. Cl. ............................................. 451/5; 451/180
(58) Field of Classification Search .................. 451/5, 8, 451/9, 180, 262; 29/33 R
See application file for complete search history.

(56) References Cited

U.S. PATENT DOCUMENTS

| | | | | |
|---|---|---|---|---|
| 4,610,153 | A | * | 9/1986 | Nedorezov ....................... 72/112 |
| 6,151,124 | A | * | 11/2000 | Visscher ......................... 356/445 |
| 6,870,122 | B2 | * | 3/2005 | Sun et al. ........................ 219/109 |
| 7,192,227 | B2 | * | 3/2007 | Nordstrom et al. ............ 409/140 |
| 7,458,139 | B2 | * | 12/2008 | Nakazima ....................... 29/33 R |
| 2003/0041428 | A1 | * | 3/2003 | Recupero ....................... 29/33 R |

* cited by examiner

*Primary Examiner* — Robert Rose

(57) ABSTRACT

A method for dressing a pair of weld gun tips on a weld gun controlled by a robot is disclosed. The method comprises the steps of: placing an alignment tool in a mounting head of a tip dresser tool, with the alignment tool including a central alignment bore having a diameter corresponding in size to a diameter of the pair of weld gun tips; teaching a robot path to cause the pair of weld gun tips to slide into the central alignment bore while the alignment tool is mounted in the mounting head; removing the alignment tool from the mounting head; inserting a cutter head into the mounting head; using the taught robot path to bring the pair of weld gun tips into contact with the cutter head; and dressing the weld gun tips with the cutter head.

6 Claims, 4 Drawing Sheets

WELD GUN TIP DRESSING

BACKGROUND OF INVENTION

The present invention relates generally to a tip dresser for robotically controlled weld gun tips, and more particularly to a tip dresser and an alignment tool for a weld gun tip dresser.

Robotically controlled weld guns are employed to weld metal parts together, such as welding body panels together on a vehicle. Such weld guns may have a pair of robotically controlled arms, with weld gun tips on each arm that are brought together on opposite sides of the material to be welded before performing the welding operation. These weld gun tips (copper weld caps) periodically need to be dressed. Dressing involves brining the pair of weld gun tips into contact with the cutting blades in a cutter head of a tip dresser tool. The cutter head is rotated, causing the blades to dress the weld gun tips (somewhat similar to sharpening a pencil in a pencil sharpener).

It is important, when dressing the weld gun tips, to assure proper alignment of the weld gun tips with the cutter head. If the tips are not aligned properly with the cutter head during this process, bad welds can result. A tradesman, then, who tries to assure that the alignment is proper relies on visual orientation of the tips to assure the tips are aligned with the center of the cutter head. However, the contour of the blades on the cutter head make it relatively difficult for the tradesman to tell when the tips are properly centered on the cutter head. If, after dressing the tips, it turns out that the weld gun tips are not aligned with the cutter head, the tradesman must then re-teach the robot path again, and try all over again until they are correctly centered. This trial and error process can be slow and thus costly. Consequently, it is desirable to have a better method of dressing the weld gun tips for a robotically controlled weld gun.

SUMMARY OF INVENTION

An embodiment contemplates a method for dressing a pair of weld gun tips on a weld gun controlled by a robot, the method comprising the steps of: placing an alignment tool in a mounting head of a tip dresser tool, with the alignment tool including a central alignment bore having a diameter corresponding in size to a diameter of the pair of weld gun tips; teaching a robot path to cause the pair of weld gun tips to slide into the central alignment bore while the alignment tool is mounted in the mounting head; removing the alignment tool from the mounting head; inserting a cutter head into the mounting head; using the taught robot path to bring the pair of weld gun tips into contact with the cutter head; and dressing the weld gun tips with the cutter head.

An embodiment contemplates an apparatus for aligning a pair of weld gun tips on a weld gun controlled by a robot. The apparatus may comprise a tip dresser tool including a mounting head having a hole therethrough; and an alignment tool having an outer surface in mating engagement with the hole, and a central alignment bore extending through the alignment tool and having a diameter corresponding in size to a diameter of the weld gun tips and centered in the mounting head.

An advantage of an embodiment is that proper alignment of weld gun tips while they are being dressed is assured, thus avoiding weld concerns that may arise from improper alignment during tip dressing. Visual estimations of proper tip alignment with a cutter head is no longer needed. The alignment can be performed during initial setup of the robot and tip dresser tool, as well as to later verify that the path is still correct. The alignment may also be applied with fixed location weld guns with movable tip dresser tools.

DETAILED DESCRIPTION

Figure 1:
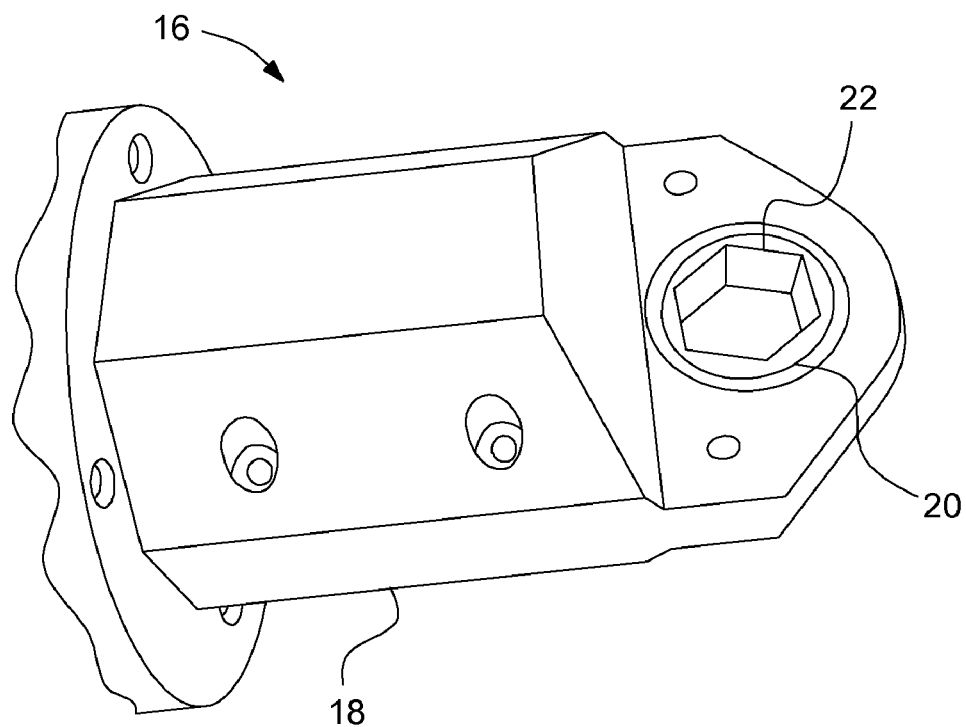
FIG. 1 is a perspective view of a portion of a tip dresser tool prior to installation of a cutter head or an alignment tool into the tip dresser.
Figure 8:
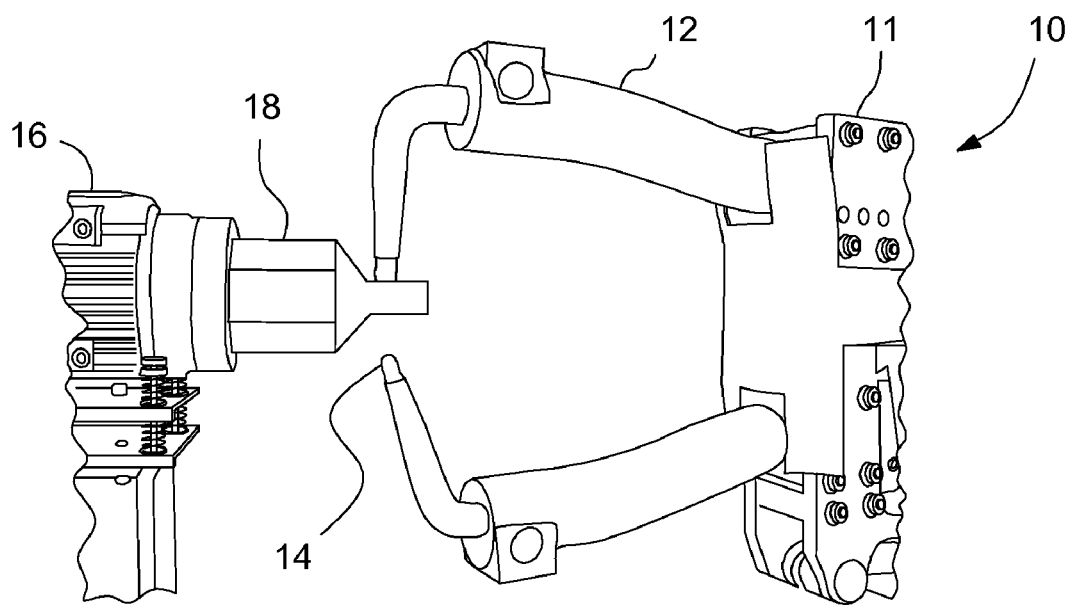
FIG. 8 is a perspective view of a portion of the tip dresser tool and the robot assembly just prior to dressing the weld gun tips.

FIG. 8 illustrates a portion of a robot assembly 10 that includes a pair of robot weld arms 12, which are part of a robot mounted weld gun 11. Each of the weld arms 12 includes a weld gun tip (copper weld caps) 14. The weld gun tips 14 require periodic dressing to assure proper welds and need to be properly aligned with a tip dresser tool 16. FIG. 1 shows a portion of the tip dresser tool 16 during dressing. The tip dresser tool 16 includes a tip dresser arm 18 cantilevered out to a free end that includes a mounting head 20. The mounting head 20 includes a hexagonal hole 22 therethrough and can be rotationally driven by the tip dresser tool 16.

Figure 2:
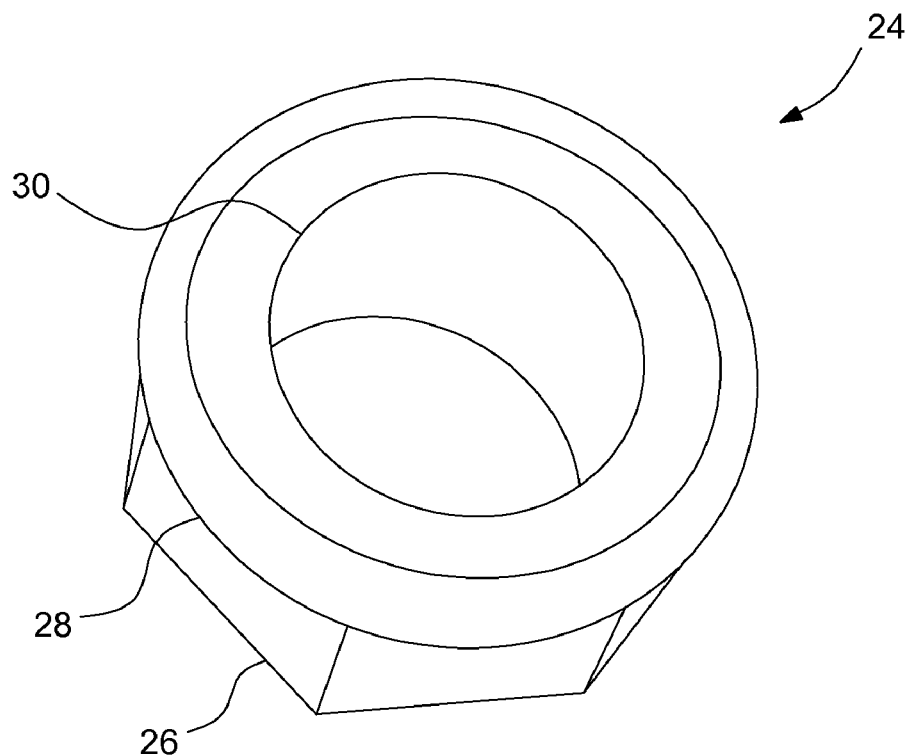
FIG. 2 is a perspective view of an alignment tool used with the tip dresser tool.
Figure 3:
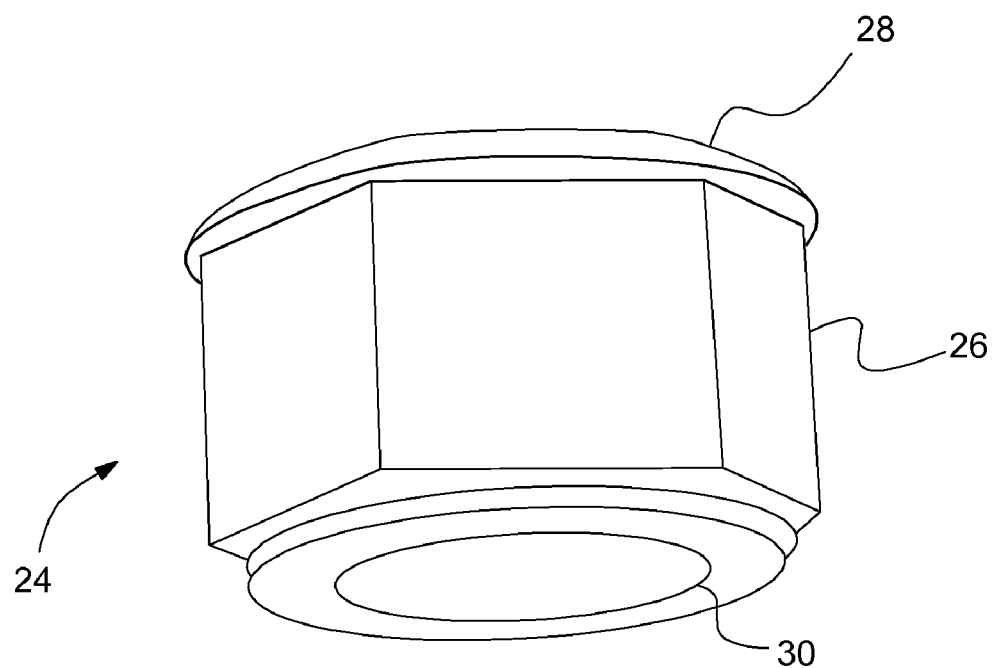
FIG. 3 is another perspective view of the alignment tool of FIG. 2.

FIGS. 2 and 3 show an alignment tool 24 that has a hex-shaped outer surface 26 that is sized and shaped to mate with the hexagonal hole in the mounting head. The alignment tool 24 also includes a support lip 28 extending radially from an upper end and a central alignment bore 30 through its center. The diameter of the central alignment bore is sized to match the size of the particular weld gun tips to be dressed, with the diameter of the central alignment bore 30 being slightly larger than the diameter of the particular weld gun tips to allow them to slide in without binding. Thus, there can be multiple alignment tools with the same outer surface 26, but with each having a different diameter central alignment bore 30 to match the particular weld gun tips to be dressed.

Figure 4:
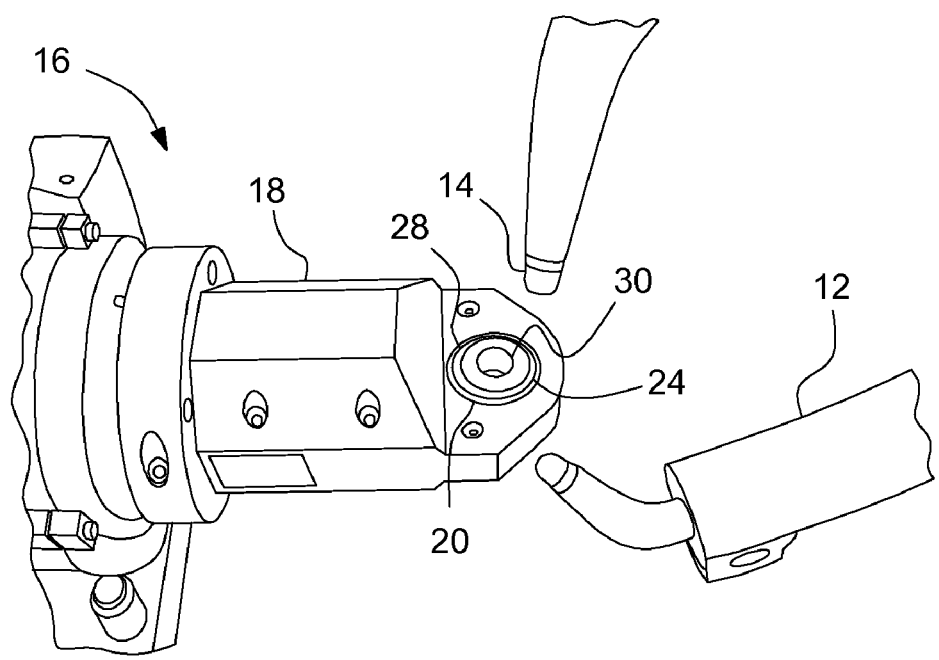
FIG. 4 is a perspective view of a portion of the tip dresser tool and the robot assembly with the alignment tool mounted in the tip dresser tool.
Figure 5:
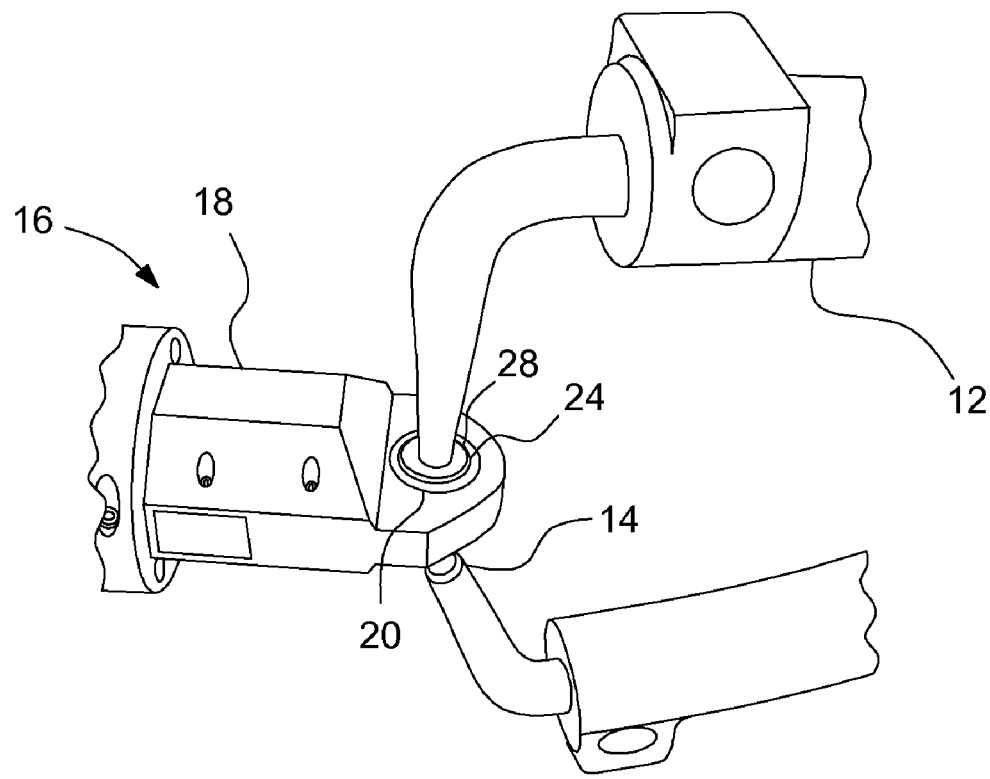
FIG. 5 is a perspective view of a portion of the tip dresser tool with the alignment tool mounted in the tip dresser tool, and with weld gun tips aligned in the alignment tool.

FIGS. 4 and 5 show the alignment tool 24 mounted in the mounting head 20 on the tip dresser arm 18 of the tip dresser tool 16. The support lip 28 extends radially outward far enough to support the alignment tool 24 and prevent it from falling through the hexagonal hole in the mounting head 20. The central alignment bore 30 defines the proper location for the weld gun tips 14 during tip dressing. This allows the weld arms 12 to position the weld gun tips 14 so they will be centered on a cutter head.

Figure 6:
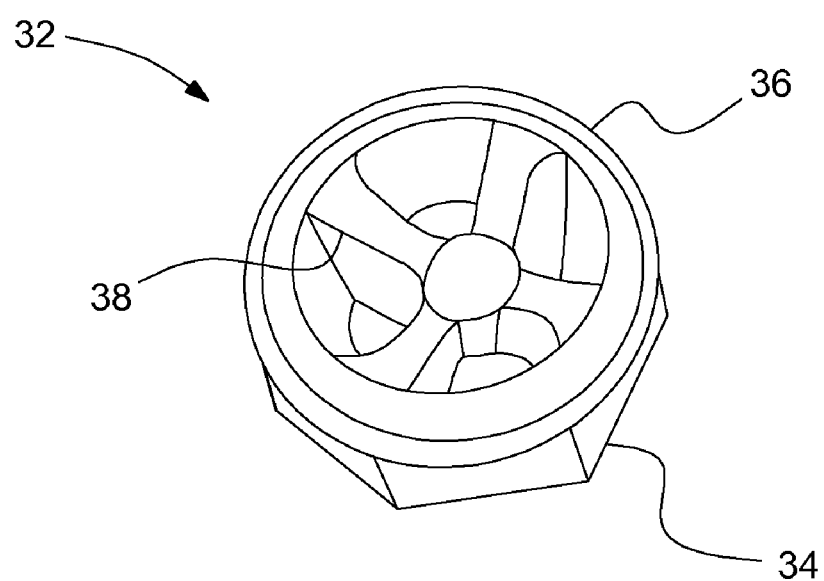
FIG. 6 is a perspective view of a cutter head for use with the tip dresser tool.

FIG. 6 shows a cutter head 32 having a hex-shaped outer surface 34 that is sized and shaped to mate with the hexagonal hole in the mounting head. The cutter head also includes a support lip 36 extending radially from an upper end. Four contoured cutting blades 38 extend within an interior portion of the cutter head 32. These blades 38 are used to dress the weld gun tips from both the top and bottom of the tip dresser tool. The contour of the cutting blades 38 make it difficult to tell when the weld gun tips are properly centered over the blades 38.

Figure 7:
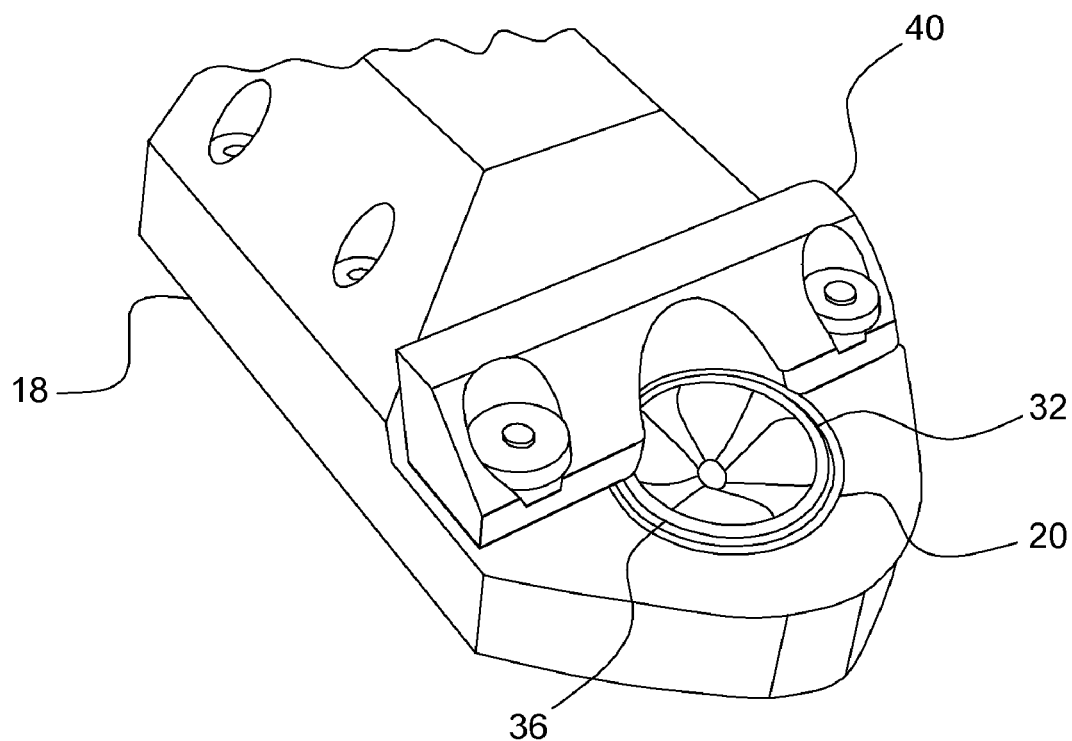
FIG. 7 is a perspective view of a portion of the tip dresser tool with the cutter head and a retainer mounted to the tip dresser tool.

FIG. 7 shows the tip dresser arm 18 with the cutter head 32 installed in the mounting head 20. The support lip 36 keeps the cutter head 32 from falling through the hexagonal hole in the mounting head 20. A retainer 40 may be mounted on top of the tip dresser arm 18 to retain the cutter head 32 as the mounting head 20 is spinning the cutter head 32.

FIG. 8 shows the tip dresser arm 18 extending from a main housing 42 of the tip dresser tool 16. The robot controlled weld gun 11 is moving the robot weld arms 12 into position so the weld gun tips 14 can be dressed.

The process of aligning and dressing the weld gun tips 14 will now be discussed with reference to FIGS. 1-8. This process assumes the robot weld arms 12 are properly aligned—if not, then that alignment must be addressed first. In this process, the cutter head 32 is removed, leaving an open hole 22 in the mounting head 20 of the tip dresser tool 16 (see FIG. 1). The alignment tool 24 is then inserted into the hexagonal hole 22 in the mounting head 20 (see FIG. 4). The particular alignment tool chosen will depend upon the particular weld gun tips 14 being used with that weld gun 11 and, thus, the diameter of the central alignment bore 30 needed. The robot assembly is taught the path for the weld arms 12 to move in order for the weld gun tips 14 to slide into the central alignment bore 30 of the alignment tool 24 (see FIGS. 4 and 5). Sliding the weld gun tips 14 into the central alignment bore 30 assures that they will be properly centered during tip dressing. No visual guessing is required by the technician to assure proper centering. The weld gun tips 14 are removed from the central alignment bore 30, and the alignment tool 24 is removed from the mounting head 20.

The cutter head 32 is slid into the hexagonal hole 22 and the retainer 40 is secured to the tip dresser arm 18 to retain the cutter head 32 (see FIG. 7). The robot path that was taught may be adjusted slightly (in the up and down direction) to assure that the weld gun tips 14 will just contact the cutter head 32 without the robot trying to drive the tips 14 through the cutting blades 38. The tip dresser tool 16 is now ready to be used when the weld gun tips 14 need dressing.

Periodically, after welding operations are completed, the weld gun tips 14 may need dressing. At this point, the tip dresser tool 16 will be activated, causing the mounting head 20 to spin the cutter head 32. The robot 10 will be requested to move through the tip dressing path taught earlier (when the alignment tool was employed). This path may be, for example, that the robot 10 moves the weld arms 12 until the upper weld gun tip 14 is centered on and in contact with the cutting blades 38 of the cutter head 32, then the lower weld arm 12 pivots upward until the lower weld gun tip 14 contacts the blades 38 of the cutter head 32. The spinning of the cutter head 32 causes the blades 38 to dress the weld gun tips 14 (somewhat like a pencil sharpener sharpening a pencil). The robot 10 then moves the weld arms 12 away from the tip dresser tool 16 and may resume welding operations until such time as tip dressing is again needed.

Alternatively, this method may be employed with a weld gun having generally stationary weld arms. In this case, the tip dresser tool is mounted for movement by a robot. The path of the tip dresser is taught so that the weld gun tips are centrally aligned with the central alignment bore of the alignment tool. Then when the cutter head is in place and tip dressing is needed, the tip dresser tool is moved into position to allow for dressing of the weld gun tips.

While certain embodiments of the present invention have been described in detail, those familiar with the art to which this invention relates will recognize various alternative designs and embodiments for practicing the invention as defined by the following claims.

What is claimed is:

1. A method for dressing a pair of weld gun tips on a weld gun controlled by a robot, the method comprising the steps of:
   (a) placing an alignment tool in a mounting head of a tip dresser tool, with the alignment tool including a central alignment bore having a diameter corresponding in size to a diameter of the pair of weld gun tips;
   (b) teaching a robot path to cause the pair of weld gun tips to slide into the central alignment bore while the alignment tool is mounted in the mounting head;
   (c) removing the alignment tool from the mounting head;
   (d) inserting a cutter head into the mounting head;
   (e) using the taught robot path to bring the pair of weld gun tips into contact with the cutter head; and
   (f) dressing the weld gun tips with the cutter head.

2. The method of claim 1 wherein step (b) is further defined by the robot path including a robot assembly moving weld arms carrying the weld gun tips into the central alignment bore.

3. The method of claim 1 wherein step (a) is further defined by the alignment tool having a support lip and the alignment tool being placed in the mounting head such that the support lip supports the alignment tool in the mounting head.

4. The method of claim 1 wherein step (d) is further defined by securing a retainer to the tip dresser tool operatively engaging the cutter head to maintain the cutter head in the tip dresser tool while allowing the cutter head to rotate.

5. The method of claim 1 further including, prior to step (e), adjusting the taught robot path vertically while maintaining the centering of the weld gun tips relative to the mounting head to obtain a desired vertical contact of the weld gun tips with the cutter head.

6. The method of claim 1 further including, prior to step (b), aligning the weld gun tips, if out of alignment.

* * * * *